United States Patent [19]
Peck

[11] 3,909,695
[45] Sept. 30, 1975

[54] REGULATION AND STABILIZATION IN A SWITCHING POWER SUPPLY

[75] Inventor: Robert D. Peck, Parsippany, N.J.

[73] Assignee: Hewlett-Packard Company, Palo Alto, Calif.

[22] Filed: Oct. 17, 1973

[21] Appl. No.: 407,399

[52] U.S. Cl. ............... 321/2; 321/18; 323/22 T; 323/DIG. 1; 307/297
[51] Int. Cl.² ............... G05F 1/64; H02P 13/24
[58] Field of Search ............ 321/2, 18, 19; 323/17, 323/22 T, DIG. 1; 328/142, 145; 307/297

[56] References Cited
UNITED STATES PATENTS

| | | | |
|---|---|---|---|
| 3,027,508 | 3/1962 | Johnson | 321/19 |
| 3,517,301 | 6/1970 | Huber | 321/18 X |
| 3,577,059 | 5/1971 | Kelley, Jr. | 321/18 X |
| 3,597,674 | 8/1971 | Abbey | 321/18 X |
| 3,670,234 | 6/1972 | Joyce | 321/18 |
| 3,743,917 | 7/1973 | Zettl et al. | 321/18 |
| 3,781,654 | 12/1973 | Simcoe | 323/DIG. 1 |

*Primary Examiner*—Gerald Goldberg
*Attorney, Agent, or Firm*—Ronald E. Grubman

[57] ABSTRACT

A switching-type power supply is provided in which switching transistors are switched off periodically in response to an oscillator to establish a basic operating frequency, but switched on at varying times during the basic period, in response to a signal from a first feedback loop, whenever the sensed output voltage level is less than a desired voltage level. When the duty cycle of the switching transistors is less than 50 percent, stability is provided by augmenting the sensed output voltage by an additional voltage with a parabolic waveform. In accordance with one embodiment of the invention, a second feedback loop responsive to slow variations in the load provides an input to the first feedback loop.

12 Claims, 3 Drawing Figures

REGULATION AND STABILIZATION IN A SWITCHING POWER SUPPLY

BACKGROUND OF THE INVENTION

This invention is concerned generally with switching power supplies, and more particularly with a new method for using pulse width modulation of switching transistors to obtain voltage regulation.

Switching power supplies, or regulators, have traditionally combined high efficiency with small size. Typically a switching regulator includes a switching device such as a transistor for making and breaking a circuit to create an A.C. current through the primary of a transformer. The output of the secondary of the transformer is rectified and filtered using one or more stages of filtering with inductors and capacitors in a well known manner. Regulation is achieved by using an error signal from the output to control the duty cycle or frequency, or both, of the switching device. In the regulators known in the prior art, it has been a problem to obtain fast transient response and adequate rejection of ripple voltages on the output. Particularly at light loads, the current in the output filter choke (or chokes) can drop to zero during some of the "off" periods of the switching duty cycle so that the output filter becomes noncritical. This non-linear effect introduced into the system makes it difficult to apply conventional feedback compensation techniques for regulating the voltage. Heretofore, designers typically comprised by using a basic feedback loop that was slow to respond, which in turn leads to poor rejection of 120 Hz ripple and relatively poor transient recovery.

Various solutions were attempted in the prior art to obtain better transient response and better rejection of ripple. One scheme utilizes conventional LC filters and an externally generated saw-tooth waveform. The saw-tooth is added to the output voltage ripple, and the sum of the saw-tooth and the ripple is compared to a reference voltage. Whenever the difference of these voltages is negative, the switching transistor is turned on. However, in order to accommodate the saw-tooth the output filter requires the use of a relatively large inductance and a relatively small capacitance, which results in large transient overshoots.

A second regulation scheme known in the prior art is the "proportional control" sysem, which utilizes an error signal which is the amplified difference between the actual voltage output of the supply and the desired output voltage. This error signal is applied to a fixed repetition rate pulse generator which in turn generates a variable pulse width proportional to the magnitude of the error signal. The variable pulse width is applied to the switching transistor to vary the duty cycle within the given repetition cycle. To achieve stability, the error signal is typically generated using an integrating amplifier, and consequently, devices using this form of feedback control tended to be quite slow, inadequate voltage ripple rejection being still a considerable problem.

Another system which uses pulse modulation to regualate the supply is the "double-ended limit cycld" system. The outout voltage is -worced to oscillate between two preset voltage limits by switching the switching transistor "on" when the output voltage falls below a certain reference level, and by switching the transistor "off" when the output voltage uses above another reference level. This system has the advantage of good ripple rejection, but results in variable frequency operation, often over a range of 3:1 or even more. In order to provide good ripple rejection at the lower switching frequencies, devices which use this method of control required very large inductances in the output filters. In addition, this technique usually operates at audio frequencies with the resulting acoustical noise being present.

SUMMARY OF THE INVENTION

The present invention provides a switching power supply with high speed response and good ripple rejection while eliminating many of the problems and complexities of the devices known in the prior art. In accor- invention uses a pulse width modulator to drive several switching transistors in the primary of a transformer, the output of which is rectified and filtered to provide a D.C. voltage supply. The pulse width modulator is driven by an error voltage which is equal to the difference between the actual output voltage of the supply including the ripple, and the desired output voltage, which is represented by a reference voltage. These voltages are compared on a cycle-by-cycle basis so that any sudden changes in the output can be compensated for in a time about equal to half the fundamental switching time of the system. According to one embodiment of the invention the pulse width modulator causes the switching transistors to close when the output voltage is less than the reference voltage, and to open periodically in response to a fixed frequency supplied by an oscillator. The system thus operates at a basic fixed frequency, the duty cycle of the switching transistors being varied within each period.

In order to provide stability to the system when the duty cycle falls below 50 percent, a parabolic waveform is added to the feedback voltage which is compared with the reference voltage. This augmentation of the sensed output voltage with a parabolic voltage causes the feedback signal to drop more quickly when the duty cycle is short. The result is a system which is unconditionally stable against oscillations which might otherwise occur when the duty cycle is less than 50 percent.

In accordance with another embodiment of the invention an additional feedback loop is used which includes a "slow loop" amplifier. In this embodiment the voltage output as measured at the load terminals (the output of a second filter stage) is compared with a fixed reference voltage in an amplifier whose fundamental response time is large compared to the switching period of the system. This slow loop feedback portion of the invention serves to compensate for voltage changes arising from slow variations in the load. In this embodiment the output of the slow amplifier is compared with a voltage sensed at the output of a first filter stage, the difference being used to close the transistor switch as described above.

In either of the embodiments described above, the operation of the switching transistors may be inverted; i.e. the transistors are closed in accordance with a clock cycle and opened whenever the output voltage exceeds a certain reference voltage. However, in that dmbodiment instability occurs for duty cycles greater than 50 percent. The stabilizing signal must therefore be inverted in polarity.

DETAILED DESCRIPTION OF THE INVENTION

Figure 1:
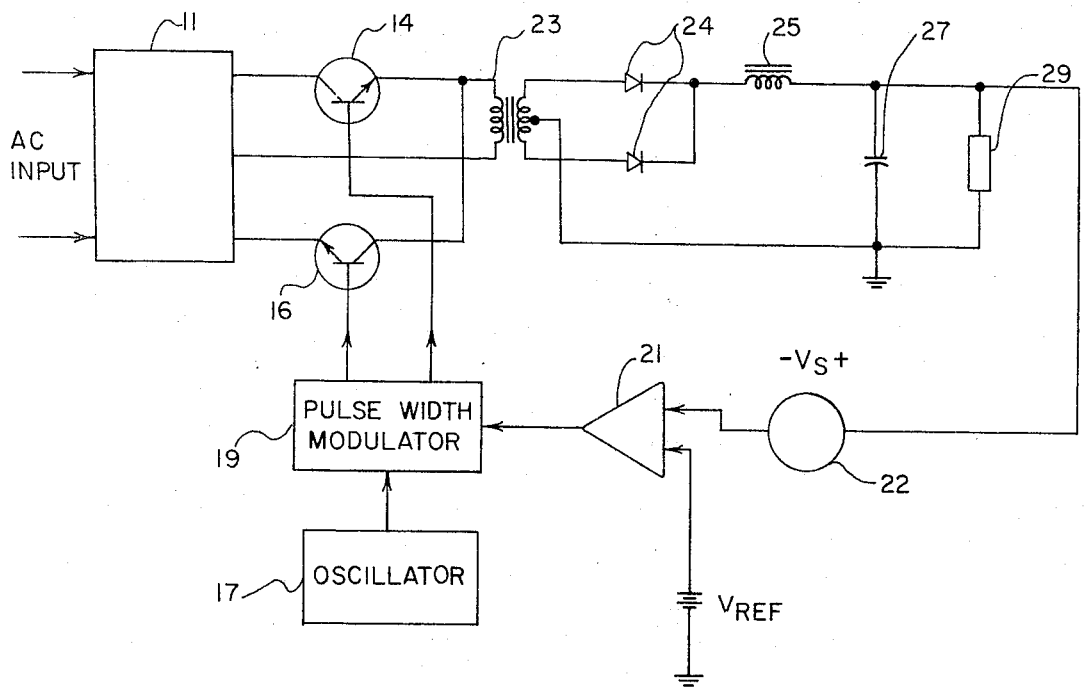
FIG. 1 is a schematic representation of an embodiment of the invention in which regulation and stabilization are provided using one feedback loop including a stabilizing voltage.

In FIG. 1 there is shown an input rectifier/filter circuit 11 which is used to produce a D.C. voltage from an A.C. line voltage. The D.C. output of rectifier 11 is supplied to a switching circuit, shown here for example, as consisting of switching transistors 14 and 16, although other switching devices such as SCRS or Triacs may be used. A basic switching frequency is established by an oscillator 17 which drives the switching transistors 14 and 16.

Regulation of the D.C. output voltage is accomplished primarily by varying the duty cycle of the switching transistors 14 and 16 within the basic switching period established by oscillator 17. In more detail, the variation of the duty cycle is accomplished using a pulse width modulator 19 which is responsive to an error signal received from a turn-on comparator 21, and also to clock pulses received from oscillator 17. Whenever the actual voltage output of the device is less than a desired reference voltage, turn-on comparator 21 sends a signal to pulse width modulator 19. In response to that signal, pulse width modulator 19 alternately switches "on" one or the other of the transistors 14 and 16. However, the transistors are always switched "off" in response to the clock signal of oscillator 17, thereby establishing a basic switching frequency which is independent of variations in the output voltage. Thus, within the basic switching period, the duration of the "on" time (the duty cycle) of switching transistors 13 and 15 will be greater or lesser depending on a greater or lesser difference between the actual output voltage and the desired output voltage. It is also possible to invert the operation of the feedback system by providing that switching transistors 14 and 16 are turned "on" in response to the clock signal from oscillator 17, and switched "off" in response to an error signal generated when the voltage output exceeds a reference voltage.

A series of pulses of varying width are therefore seen by the primary of transformer 23, resulting in a series of alternately positive and negative rectangular-shaped pulses appearing at the secondary of that transformer. The pulses are full-wave rectified by using e.g. a pair of diodes 24. An LC network consisting of choke 25 and capacitor 27 effectively averages the rectified signal and produces a D.C. output voltage across load 29 whose amplitude is proportional to the duty cycle of the switching transistors 14 and 16. To complete the regulation loop, the output is measured across load 29 and fed into turn-on comparator 21 where it is compared with a reference voltage, designated $V_{REF}$. According to the invention, turn-on comparator 21 is a non-integrating type comparator, so that the error signal it generates is responsive to rapid variations in the output voltage. Corrections to the duty cycles of switching transistors 14 and 16 will therefore be made on a cycle-to-cycle basis in accordance with the clock frequency established by oscillator 17.

It is a characteristic of regulator systems such as this one that for duty cycles less than 50 percent (where the "off" periods of the switching transistors becomes greater than the "on" periods), the system will oscillate and become unstable. According to one embodiment of the invention, this condition is obviated by adding a stabilizing voltage, labeled $V_S$, produced by a stabilizing voltage source 22 to the sampled output voltage which is fed back into turn-on comparator 21. This stabilizing voltage ideally has a parabolic waveform whose magnitude is equal to the maximum peak-to-peak ripple voltage seen on the output, but it may also have other shapes, e.g. a segment of sinusoid may be used to approximate a parabola, or a periodic linear ramp may be employed. However, a parabolic shape gives optimum ripple rejection for a given amplitude of the stabilizing voltage. In an alternate embodiment, (an inverted) stabilizing voltage $V_S$ may be added to the reference voltage $V_{REF}$ rather than to the sample output voltage. In effect, the addition of a parabolic waveform $V_S$ to the feedback voltage acts to induce an earlier switching "on" of the switching transistors within each basic time period when the duty cycle is less than 50%.

Figure 2:
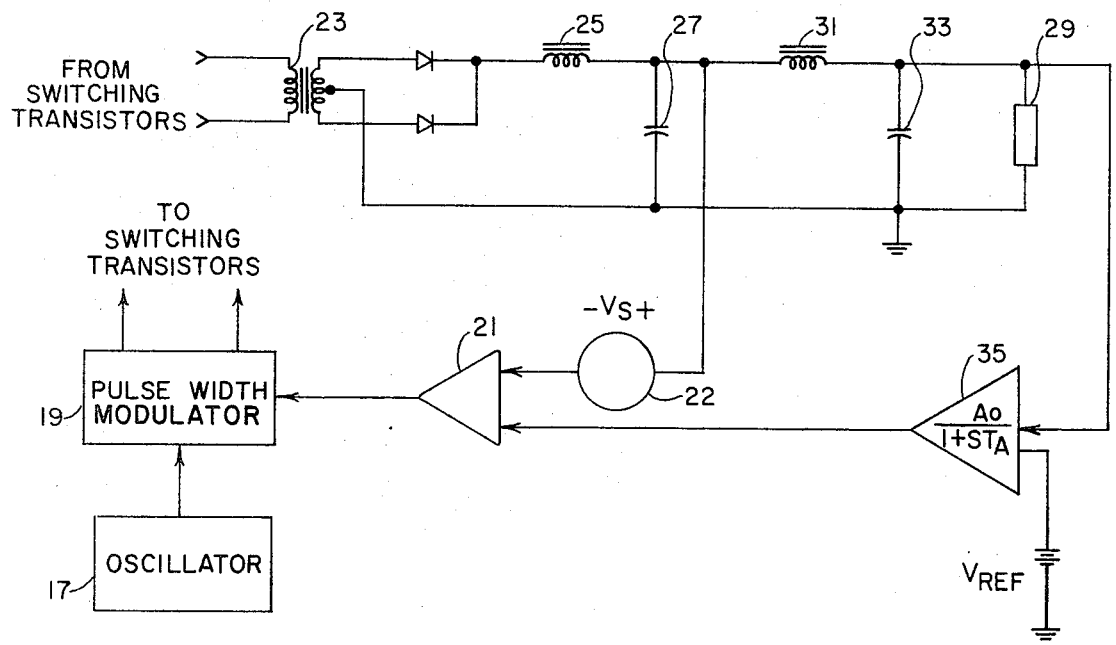
FIG. 2 is a schematic representation of an embodiment of the invention in which a second feedback loop, responsive to slow variations in the load, provides an input to a first feedback loop.

FIG. 2 again shows transformer 23 and a filter circuit including choke 25 and capacitor 27. In FIG. 2, however, there is included a second stage of filtering including choke 31 and capacitor 33. In a device including several stages of filtering such as illustrated here, coarse voltage regulation may be achieved by using a feedback voltage sensed immediately after the first filter stage, and adding to it a stabilizing voltage $V_S$ as described above in connection with FIG. 1. However, rather than comparing this feedback voltage directly with a fixed reference voltage, regulation can be improved by adding another feedback loop including a slow-loop comparator 35, (by which is meant an amplifier with a characteristic time constant much larger than the fundamental switching period of the system; e.g. if $A_o$ is the gain and $T_A$ is the characteristic response time of the amplifier, then $$A_o/2 \pi T_A << \frac{1}{T_S}$$

is a sufficient condition, where $T_S$ is the basic period of the system). One of the inputs to slow loop comparator 35 is the output voltage of the regulator sensed across load 29, while the other input is a desired reference voltage. The output of slow-loop comparator 35 is an error signal responsive to slow variations in load 29. This slowly varying output is then compared with the voltage sensed after the first filter choke 25 (augmented by the stabilizing voltage $V_S$) in turn-on comparator 21. The output of comparator 21 is used to drive pulse modulator 19 as described above in connection with FIG. 1. In this embodiment of the invention, then, the comparator 35 provides precise and relatively slow regulation of the output, while the comparator 21 provides coarser, but faster, regulation. Again, the system operation may be inverted by providing that the transformer current be switched "off" rather than "on" by the feedback loop.

As an additional feature, the regulator may be provided with a current limiter which monitors the transistor current or choke current 25 and turns the transistor switch "off" when the current exceeds a preset limit.

Figure 3:
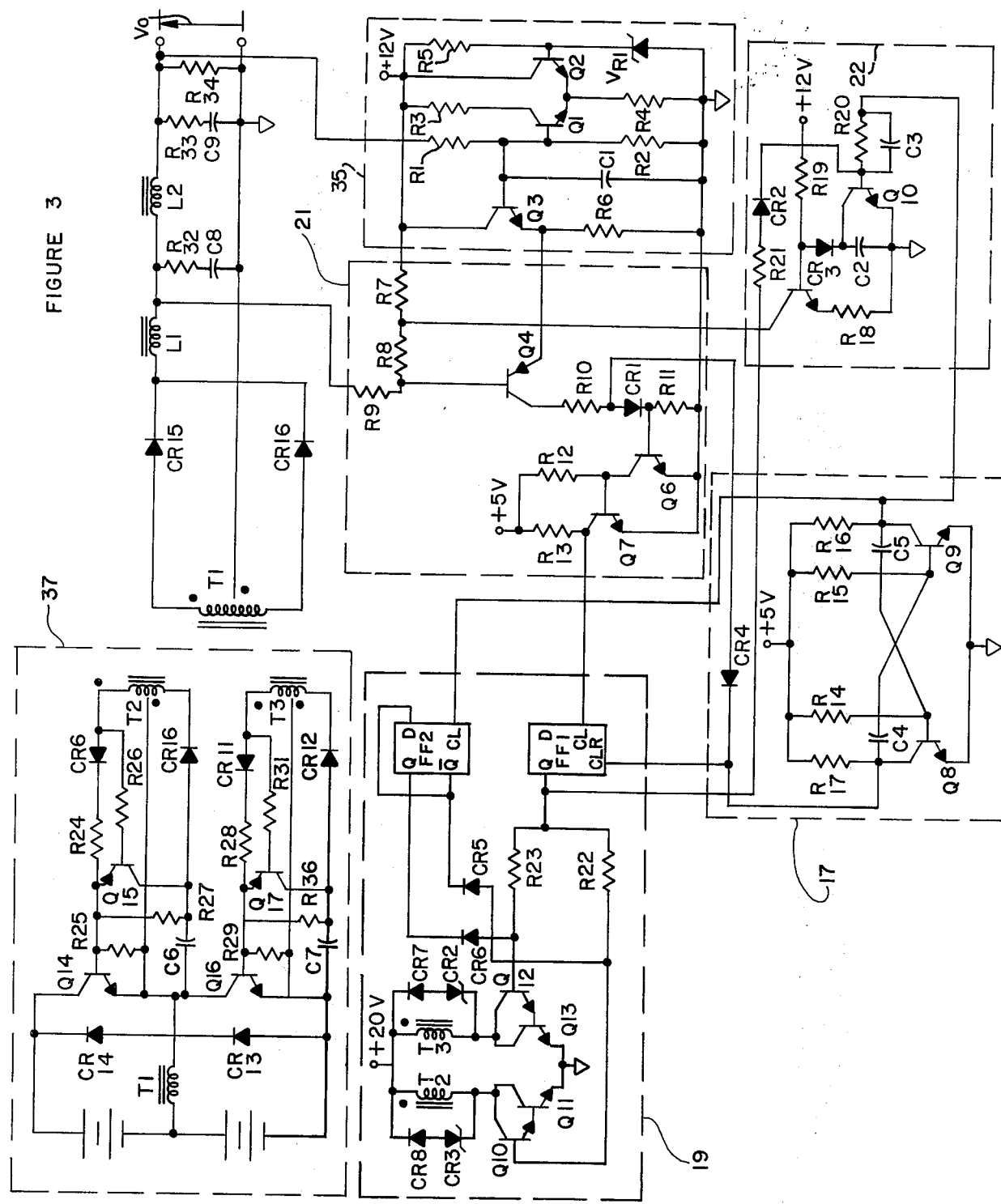
FIG. 3 is a circuit diagram illustrating in more circuit detail an embodiment of the invention.

In FIG. 3 there are shown two transistors Q14 and Q16 which serve as switching transistors which drive the primary of a transformer T1. Switching transistors Q14 and Q16 are in turn driven by switch driver circuitry including transistors Q15 and Q17. All of these elements are included in a power switching circuit block 37. Also shown is a possible embodiment for a pulse modulator 19. In the illustrated embodiment, the transistors Q10 and Q11 are arranged in a Darlington pair configuration to drive the primary of transformer T2, while Darlington pair Q12 and Q13 drive the primary of transformer T3. Two D-type positive edge triggered flip-flops $FF_1$ and $FF_2$ are used in conjunction with the Darlington pair drivers to alternate routing of switch driver signals between the two switching transistors Q14 and Q16. The basic switching frequency of the pulse modulator 19 is established by an oscillator 17, including transistors Q8 and Q9 which are used as an unsymmetrical multivibrator. Clock pulses generated by oscillator 17 are applied to the clock input of flip-flop $FF_2$ and to the reset input of flip-flop $FF_1$ to establish the basic switching frequency by turning off the switching transistor Q14 and Q16 periodically. The width of the pulses within the basic switching frequency is controlled by a signal pulse sent from a turn-on voltage comparator 21 to the clock input of flip-flop $FF_1$. Voltage comparator 21 uses transistor Q4 to compare two input voltages to derive an error voltage. One of these input voltages is sensed after one stage of filtering of the output from the secondary of transformer T1, while the other input voltage is an output from a slow-loop comparator 35. Transistors Q6 and Q7 are also included in turn-on comparator 21 and serve to amplify and shape the error voltage generated by transistor Q4 into the signal pulse which is applied to the clock input of flip-flop $FF_1$.

A parabolic waveform such as described in connection with FIGS. 1 and 2, is supplied by an equalization circuit 22 and added to the voltage sensed after choke $L_1$ to provide stability when the duty cycle of switching transistors Q14 and Q16 is below 50%. Equalization circuit 22 uses the non-linear characteristics of a transistor Q5 driven by an effective constant current source, including a large resistor R19, to produce the parabolic voltage waveform which is summed with the voltage sensed after choke filter $L_1$ and applied to the base of the comparator Q4.

The slow loop comparator 35 which provides the second input to turn-on comparator Q4 utilizes transistors Q1, Q2 and Q3 in conjunction with capacitor C1 to form a slow amplifier in which the voltage output of the device sensed across a load R34 is compared with a reference voltage established by a resistor R5 and a zener diode $V_{R1}$.

I claim:

1. A regulating device for producing a regulated D.C. voltage comprising:
   a pair of input terminals for receiving an input signal;
   input means coupled to the input terminals for producing a first D.C. signal in response to the input signal;
   switching means coupled to the first input means for producing primary pulses at a predetermined frequency by switching the first D.C. signal on and off;
   transformer means coupled to the switching means for producing secondary pulses responsive to the primary pulses;
   output rectifying means coupled to the transformer means for rectifying the secondary pulses;
   first output filtering means coupled to the output rectifying means for filtering the rectified secondary pulses, thereby producing an output D.C. voltage;
   first comparison means coupled to the first output filtering means for comparing a D.C voltage sensed at the output of the first output filtering means with a first reference voltage, and producing a trigger signal when the level of the sensed voltage differs from the level of the first reference voltage by a predetermined amount, said comparison means operating to compare the voltages at each cycle of operation;
   active circuit means for producing a stabilizing voltage and summing the stabilizing voltage with one of the sensed voltage and the first reference voltage before comparison of the sensed voltage and the first reference voltage in the comparison means;
   pulse width modulating means coupled to the first comparison means and to the switching means for varying the width of the primary pulses produced by the switching means, in response to the trigger signal from the first comparison means; and
   oscillating means coupled to the pulse width modulating means for establishing the predetermined frequency of the primary pulses produced by the switching means.

2. A regulating device as in claim 1 wherein:
   the first comparison means produces a trigger signal when the level of the sensed voltage is less than the level of the first reference voltage; and
   the pulse width modulating means varies the width of the primary pulses by turning the switching means "on" in response to the trigger signal from the first comparison means.

3. A regulating device as in claim 1 wherein:
   the first comparison means produces a trigger signal when the level of the sensed voltage exceeds the level of the first reference voltage; and
   the pulse width modulating means varies the width of the primary pulses by turning the switching means "off" in response to the trigger signal from the first comparison means.

4. A regulating device as in claim 1 wherein the active circuit means produces a stabilizing voltage of a parabolic waveform.

5. A regulating device as in claim 1 wherein the active circuit means produces a stabilizing voltage of a sinusoidal segment waveform.

6. A regulating device as in claim 1 wherein the active circuit means produces a stabilizing voltage of a linear ramp waveform.

7. A regulating device as in claim 1 including:
   second output filtering means coupled to the first output filtering means;
   second comparison means coupled to the second output filtering means for comparing a D.C. voltage sensed at the output of the second output filtering means with a second reference voltage and producing an output error voltage to serve as the first reference voltage for the first comparison means.

8. A regulating device as in claim 7 wherein:

the first comparison means produces a trigger signal when the level of the sensed voltage is less than the level of the first reference voltage; and the pulse width modulating means varies the width of the primary pulses by turning the switching means "on" in response to the trigger signal from the first comparison means.

9. A regulating device as in claim 7 wherein:

the first comparison means produces a trigger signal when the level of the sensed voltage exceeds the level of the first reference voltage; and the pulse width modulating means varies the width of the primary pulses by turning the switching means "off" in response to the trigger signal from the first comparison means.

10. A regulating device as in claim 7 wherein the active circuit means produces a stabilizing voltage of a parabolic waveform.

11. A regulating device as in claim 7 wherein the active circuit means produces a stabilizing voltage of a sinusoidal segment waveform.

12. A regulating device as in claim 7 wherein the active circuit means produces a stabilizing voltage of a linear ramp waveform.

* * * * *

UNITED STATES PATENT AND TRADEMARK OFFICE
CERTIFICATE OF CORRECTION

PATENT NO. : 3,909,695
DATED : September 30, 1975
INVENTOR(S) : Robert D. Peck

It is certified that error appears in the above-identified patent and that said Letters Patent are hereby corrected as shown below:

Column 1, line 29, "comprised" should read -- compromised --; line 61, "alate" should read -- late --, and "cycld" should read -- cycle --; line 62, "outout" should read -- output --, and "-worced" should read -- forced --;

Column 2, line 14, after "accor-" insert -- dance with the illustrated preferred embodiments, the --; line 65, "dmbodiment" should read -- embodiment --.

Signed and Sealed this sixth Day of January 1976

[SEAL]

Attest:

RUTH C. MASON
Attesting Officer

C. MARSHALL DANN
Commissioner of Patents and Trademarks